(12) United States Patent
Pallini, Jr. et al.

(10) Patent No.: US 10,077,858 B2
(45) Date of Patent: Sep. 18, 2018

(54) ANTI-ROTATION KEY FOR THREADED CONNECTORS

(71) Applicant: Vetco Gray Inc., Houston, TX (US)

(72) Inventors: Joseph William Pallini, Jr., Tomball, TX (US); Daniel Paul McGowan, Houston, TX (US); Dennis Robert Martinchich, Houston, TX (US); Andrew Andor Zac-Williams, Houston, TX (US); William Alexander Loose-Mitchell, Houston, TX (US)

(73) Assignee: Vetco Gray, LLC, Houston, TX (US)

( * ) Notice: Subject to any disclaimer, the term of this patent is extended or adjusted under 35 U.S.C. 154(b) by 69 days.

(21) Appl. No.: 14/877,412

(22) Filed: Oct. 7, 2015

(65) Prior Publication Data

US 2016/0369920 A1 Dec. 22, 2016

Related U.S. Application Data

(60) Provisional application No. 62/181,526, filed on Jun. 18, 2015.

(51) Int. Cl.
| | | |
|---|---|---|
| *F16L 15/08* | (2006.01) | |
| *E21B 17/043* | (2006.01) | |
| *E21B 17/08* | (2006.01) | |
| *F16L 15/06* | (2006.01) | |

(52) U.S. Cl.
CPC .......... *F16L 15/08* (2013.01); *E21B 17/043* (2013.01); *E21B 17/08* (2013.01); *F16L 15/06* (2013.01)

(58) Field of Classification Search
CPC ................................ F16L 15/08; E21B 17/043

USPC .............................................. 285/90, 91, 92
See application file for complete search history.

(56) References Cited

U.S. PATENT DOCUMENTS

| | | | | |
|---|---|---|---|---|
| 403,952 A | | 5/1889 | McLane | |
| 439,981 A | * | 11/1890 | Stewart | E21B 17/043 279/100 |
| 1,210,378 A | * | 12/1916 | Kirley | F04B 53/143 285/91 |
| 3,086,796 A | * | 4/1963 | Yancey | E21B 17/043 285/81 |

(Continued)

FOREIGN PATENT DOCUMENTS

CN 101021147 A 8/2007

OTHER PUBLICATIONS

"Specialty Connectors & Pipe for Land, Platform, Jackup, Floater and Deepwater Applications", Vetcogrey, pp. 1-35, 2008.

(Continued)

*Primary Examiner* — David Bochna
(74) *Attorney, Agent, or Firm* — Hogan Lovells US LLP (57) ABSTRACT

A tubular member connection system includes a pin having a central axis, external pin threads, and an annular pin lip at a shoulder surface of the pin. A box has internal box threads and an annular box lip at an end surface of the box. The box threads are shaped to mate with the pin threads to releasably secure the pin to the box. A pin recess is formed in an outer diameter surface of the pin, the pin recess extending in an axial direction from the pin lip. A pin key is selectively fastenable within the pin recess, the pin key having pin teeth on an outer edge of the pin key. The box teeth are located in the box. The box teeth selectively mate with the pin teeth and resist rotation of the pin relative to the box.

20 Claims, 6 Drawing Sheets

(56) References Cited

U.S. PATENT DOCUMENTS

| | | | | |
|---|---|---|---|---|
| 3,521,911 | A | * | 7/1970 | Hanes .................... F16L 37/088 285/91 |
| 3,866,954 | A | * | 2/1975 | Slator ...................... F16L 15/00 285/91 |
| 3,948,545 | A | * | 4/1976 | Bonds .................... E21B 17/085 285/91 |
| 3,986,370 | A | * | 10/1976 | Garrison .................... E21B 4/02 285/91 |
| 4,396,061 | A | | 8/1983 | Tamplen et al. |
| 4,538,838 | A | * | 9/1985 | Pringle ................. E21B 17/043 285/91 |
| 4,610,465 | A | * | 9/1986 | Boyadjieff .............. E02B 17/00 285/91 |
| 4,648,627 | A | * | 3/1987 | Reimert ................... E21B 17/04 285/91 |
| 4,659,119 | A | * | 4/1987 | Reimert ................ E21B 17/043 285/91 |
| 4,902,047 | A | * | 2/1990 | Marietta ............... E21B 17/043 285/92 |
| 7,146,704 | B2 | * | 12/2006 | Otten ...................... F16L 15/08 285/330 |
| 7,887,098 | B2 | * | 2/2011 | Aas ....................... E21B 17/043 285/92 |
| 8,690,200 | B1 | | 4/2014 | Patterson, Jr. |
| 8,950,785 | B2 | | 2/2015 | Raynal et al. |
| 2013/0207382 | A1 | * | 8/2013 | Robichaux ............ E21B 17/043 285/95 |
| 2014/0103640 | A1 | | 4/2014 | O'Dell et al. |
| 2014/0103645 | A1 | | 4/2014 | Steen et al. |
| 2014/0125053 | A1 | * | 5/2014 | Raynal .................. E21B 17/043 285/333 |
| 2014/0166308 | A1 | | 6/2014 | Steen et al. |
| 2014/0167408 | A1 | * | 6/2014 | Steen .................... E21B 17/043 285/330 |
| 2016/0369920 | A1 | * | 12/2016 | Pallini, Jr. ............. E21B 17/043 |
| 2017/0101828 | A1 | * | 4/2017 | McGowan ............ E21B 17/043 |

OTHER PUBLICATIONS

"Jack-Up Drilling & Completion Systems with Spooled Wellhead Systems",Dril Quip, pp. 1-22, 2011.

PCT Search Report and Written Opinion issued in connection with corresponding PCT Application No. PCT/US2016/037470 dated Sep. 26, 2016.

* cited by examiner

ANTI-ROTATION KEY FOR THREADED CONNECTORS

CROSS REFERENCE TO RELATED APPLICATION

This application claims priority to and the benefit of U.S. Provisional Application Ser. No. 62/181,526 filed Jun. 18, 2015, titled "Anti-Rotation Key For Threaded Connectors," the full disclosure of which is hereby incorporated herein by reference in its entirety for all purposes.

BACKGROUND

1. Field of the Disclosure

This invention relates in general to threaded tubular connections, such as for large diameter pipes used in offshore hydrocarbon drilling and production operations, and particularly to a device to prevent rotation of tubular members after they are made up.

2. Background of the Disclosure

Hydrocarbon production wells can have several strings of casing of differing diameters cemented in the well. Each casing string can be made up of joints of pipe having threaded ends that are secured together. The portion of the connector having internal threads is commonly known as a female connector or box. The portion of the connector having external threads is commonly known as a male connector or pin. Some casing joints have a pin member at a first end and a box member at a second end. Normally, the operator relies on the friction of the made-up joint to prevent the threaded connectors from loosening while running the string into the well. With larger diameter casing, for example, from 16 inch to 36 inch, the friction of the made-up connector may be inadequate to prevent loosening while running the casing.

Operators have employed anti-rotation keys to prevent loosening. Some current anti-rotation key designs require specialty tools to install the locking mechanism. Some designs require explosive powered guns to set the locking mechanism. Other designs can be difficult to unlock in the event it is necessary to unscrew the pipe connection. Other current anti-rotation key designs require drilling a hole for the locking member after the pipe connection is made up. Drilling can result in metal shavings falling down the pipe string, which can cause issues. Further, drilling a made up pipe connection requires a complex drill. If disconnected, then reconnected, it may be necessary to drill another hole, and that hole may overlap the previously drilled hole, limiting the locking capacity.

In other current casing setups, the anti-rotation key can be inserted through a hole in the box and a hammer or wrench may be employed to position and secure the key. The anti-rotation key of such systems can have teeth that bite into the connector members, either upon insertion or when the pin starts to rotate out of the box, applying an axial compressive load on the connector members and permanently deforming the connector members in order to prevent relative rotation between the box and the pin.

SUMMARY OF THE DISCLOSURE

Systems and methods described herein provide an anti-rotation key that produces significantly less axial compressive load than current anti-rotation devices. Embodiments of this disclosure provide an anti-rotation key that does not create a radial or axial compression of the threaded connection, does not generate a radial load between the pin and the box, and does not change the load path through the threaded connection, improving the fatigue life of the threaded connection.

In accordance with an embodiment of this disclosure, a tubular member connection system includes a pin having a central axis, external pin threads, and an annular pin lip at a shoulder surface of the pin. A box has internal box threads and an annular box lip at an end surface of the box. The box threads are shaped to mate with the pin threads to releasably secure the pin to the box. A pin recess is formed in an outer diameter surface of the pin, the pin recess extending in an axial direction from the pin lip. A pin key is selectively fastenable within the pin recess, the pin key having pin teeth on an outer edge of the pin key. The box teeth are located in the box. The box teeth selectively mate with the pin teeth and resist rotation of the pin relative to the box.

In accordance with an alternate embodiment of this disclosure, a tubular member connection system includes a pin having a central axis, external pin threads, and an annular pin lip at a shoulder surface of the pin. A first tubular member extends from the pin in a direction opposite the pin lip of the pin. A box has internal box threads and an annular box lip at an end surface of the box. The box threads are shaped to mate with the pin threads to releasably secure the pin to the box. A second tubular member extends from the box in a direction opposite the end surface of the box. A pin recess is formed in an outer diameter surface of the pin, the pin recess extending in an axial direction from the pin lip. A box recess is formed in an outer diameter surface of the box, the box recess extending in an axial direction from the box lip and having a box recess profile. A pin key is selectively fastenable within the pin recess, the pin key having pin teeth on an outer edge of the pin key. A box key is selectively retainable with the box recess, the box key having a box key mating profile on a first side for mating with the box recess profile. The box key further has box teeth on a second side for mating with the pin teeth and resisting rotation of the pin relative to the box.

In yet another embodiment of this disclosure, a method for connecting tubular members includes providing a pin having a central axis, external pin threads, and an annular pin lip at a shoulder surface of the pin. The pin further has a pin recess formed in an outer diameter surface of the pin, the pin recess extending in an axial direction from the pin lip. The method further includes providing a box having internal box threads and an annular box lip at an end surface of the box. The box threads are shaped to mate with the pin threads to releasably secure the pin to the box. Box teeth are located in the box. Box threads are mated with the pin threads to releasably secure the pin to the box. A pin key is fastened within the pin recess, the pin key having pin teeth on an outer edge of the pin key. The pin teeth are mated with the box teeth to resist rotation of the pin relative to the box.

BRIEF DESCRIPTION OF THE DRAWINGS

So that the manner in which the features, advantages and objects of the disclosure, as well as others which will become apparent, are attained and can be understood in more detail, more particular description of the embodiments briefly summarized above may be had by reference to the embodiment thereof which is illustrated in the appended drawings, which drawings form a part of this specification.

It is to be noted, however, that the drawings illustrate example embodiments of the disclosure and are therefore not to be considered limiting of its scope as the disclosure may admit to other equally effective embodiments.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
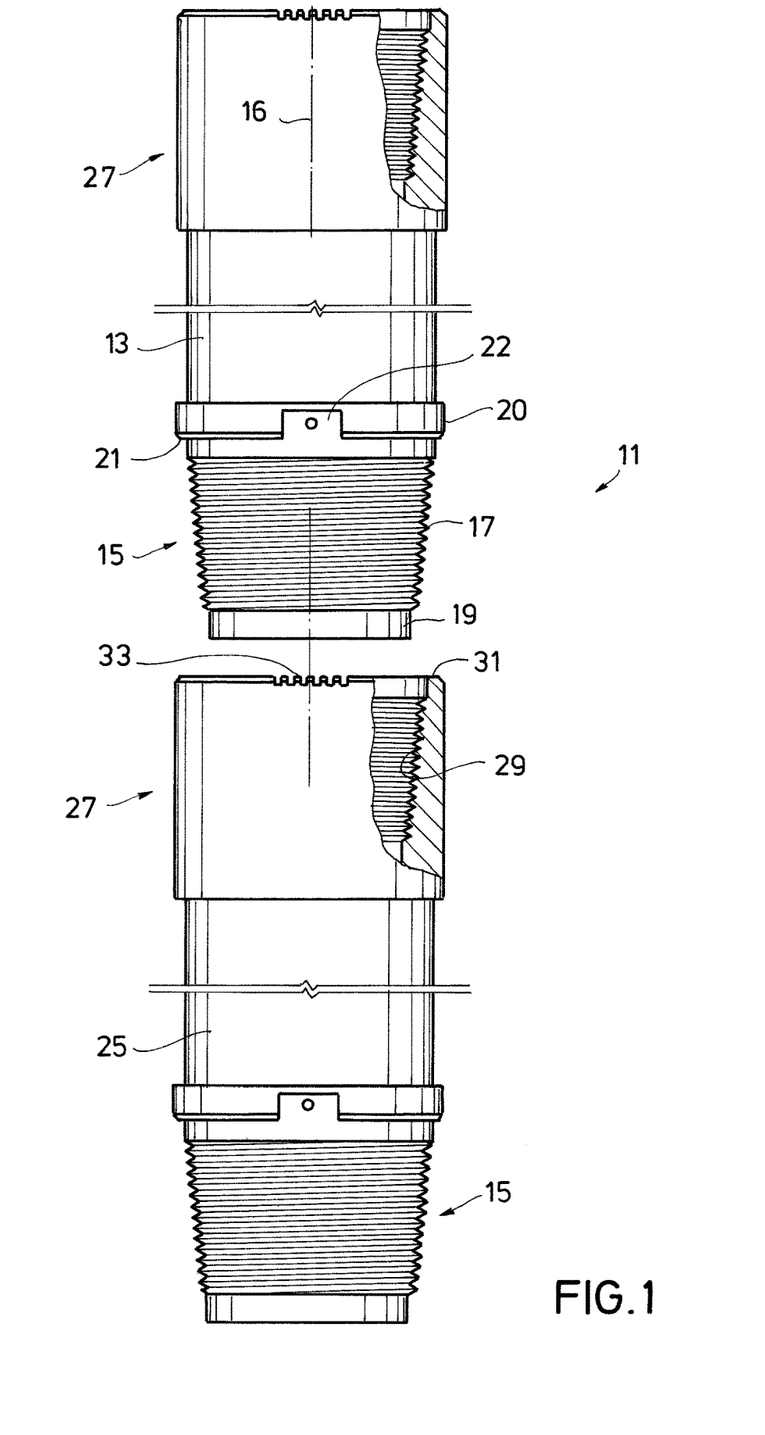
FIG. 1 is a side elevation view of a tubular string having a tubular member connector system in accordance with an embodiment of this disclosure.

Referring to FIG. 1, tubular member connection system 11 includes a first or upper tubular member 13 with pin 15 formed on an end of upper tubular member 13. The terms "upper" and "lower" are used only for convenience as pin 15 could be located on the upper end of tubular member 13 if the tubular member is inverted. Pin 15 has a longitudinal central axis 16 and a set of external pin threads 17 located on a conical surface. Pin 15 has a nose 19 on a pin end on and outer side of pin threads 17 and an external annular pin shoulder 20 at an opposite side of pin threads 17. Pin lip 21 is an annular surface of pin shoulder 20 that faces towards nose 19. Upper tubular member 13 extends from pin 15 in a direction opposite nose 19 of pin 15.

Figure 2:
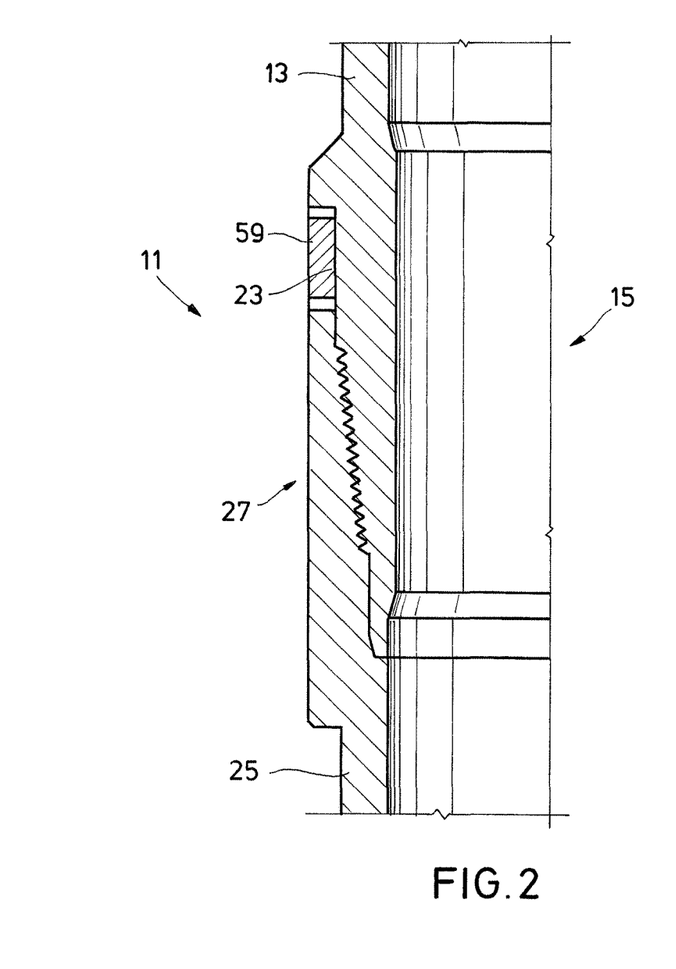
FIG. 2 is a section view of a tubular member connector system with a schematic view of an anti-rotation key in accordance with an embodiment of this application.

Pin recess 22 is formed in an outer diameter surface of pin 15. In the example of FIG. 1, pin recess 22 is formed in pin shoulder 20. Pin recess 22 is open at pin lip 21 and extends axially in a direction away from nose 19. Pin recess 22 has a depth that is less than the thickness of the sidewall of pin 15 so that pin recess 22 has a back surface 23 (FIG. 2).

Tubular member connection system 11 also includes a second or lower tubular member 25 with box 27 formed on an end of lower tubular member 25. Box 27 has internal box threads 29 shaped to mate with pin threads 17 to releasably secure pin 15 to box 27. Box 27 has annular box lip 31 at an end surface of box 27. Lower tubular member 25 extends from box 27 in a direction opposite the end surface of box 27. Upper tubular member 13 can have a second box 27 at an opposite end of upper tubular member 13 from pin 15 and lower tubular member 25 can have a second pin 15 at an opposite end of lower tubular member from box. A pin 15 of a next or adjacent tubular member can be releasably secured to box 27 of upper tubular member 13 to form a tubular string. Similarly, a box 27 of a prior or adjacent tubular member can be releasably secured to pin 15 of lower tubular member 25.

Figure 3:
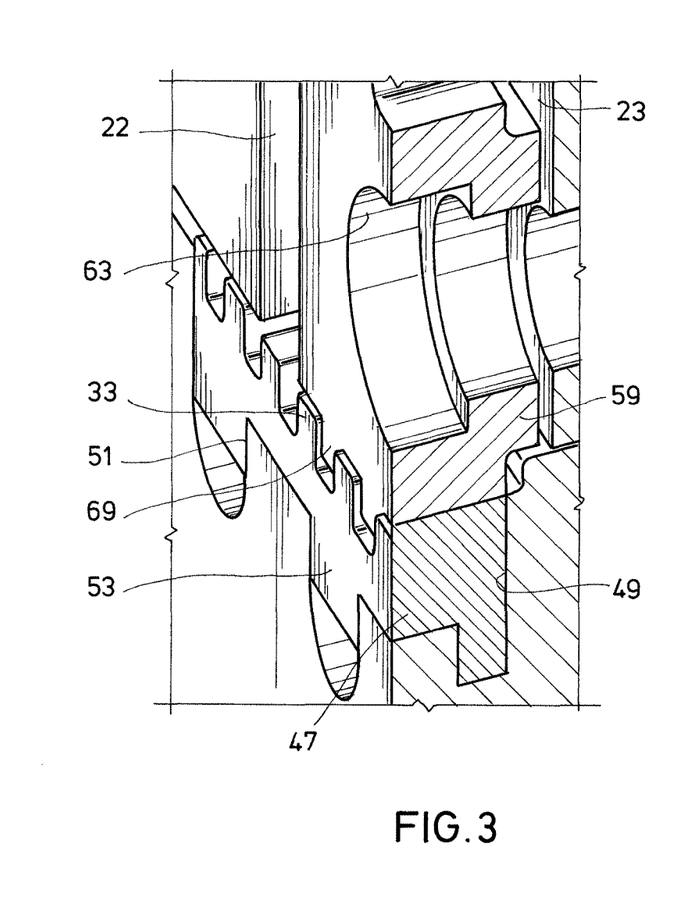
FIG. 3 is a detail section perspective view of an anti-rotation key in accordance with an embodiment of this application.
Figure 4:
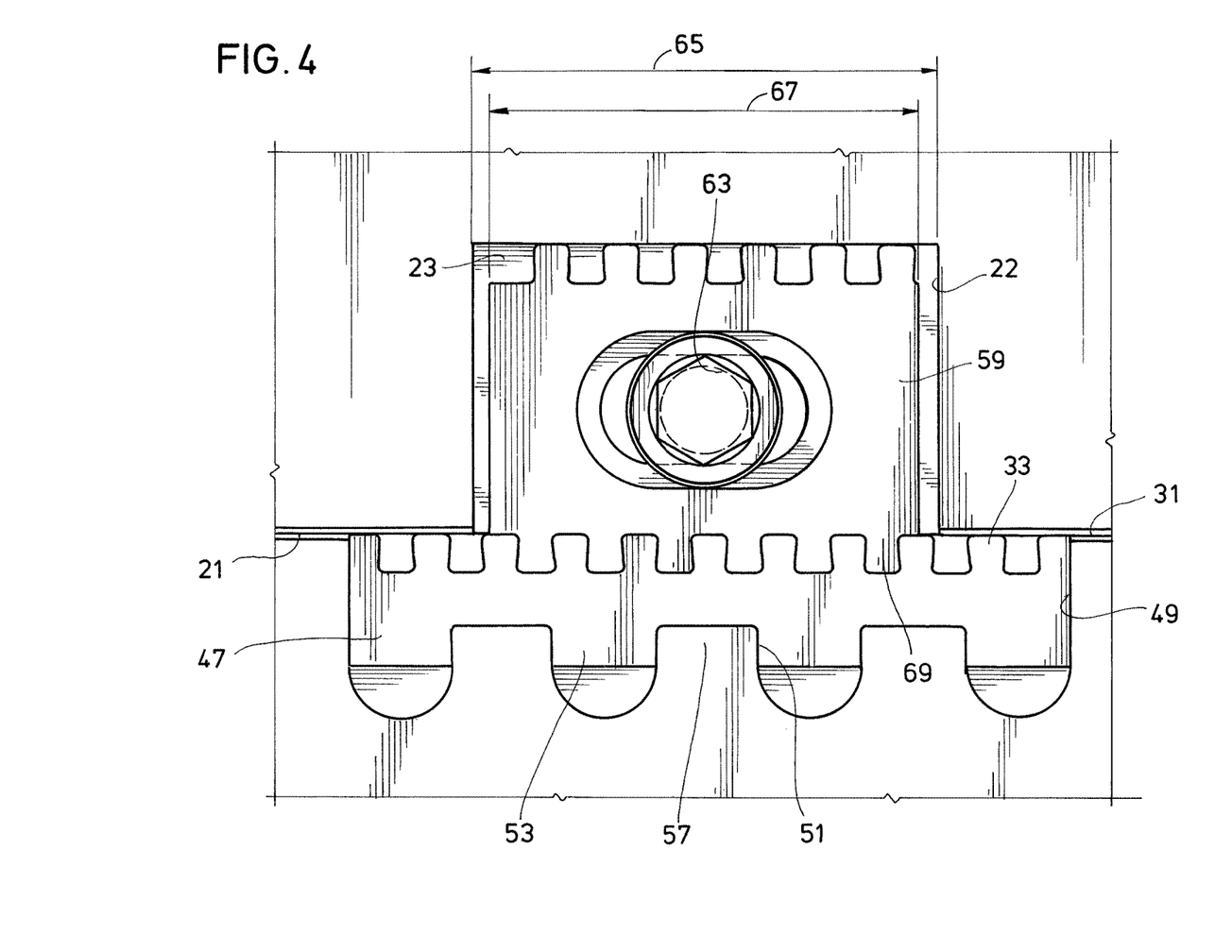
FIG. 4 is a perspective view of the anti-rotation key of FIG. 3, shown before the fastener is inserted.
Figure 5:
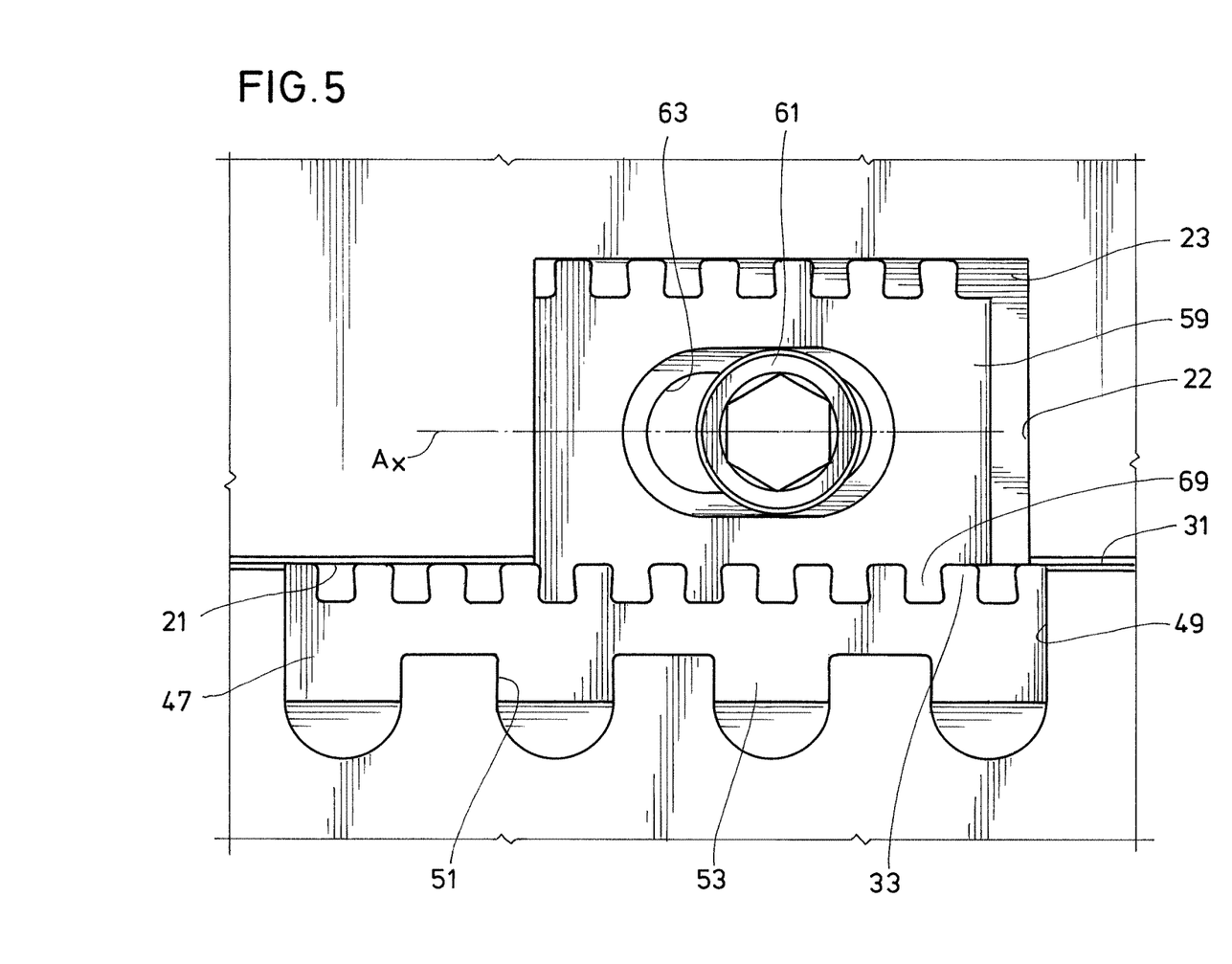
FIG. 5 is a perspective view of the anti-rotation key of FIG. 3, shown resisting relative rotational movement between the pin and the box.
Figure 6:
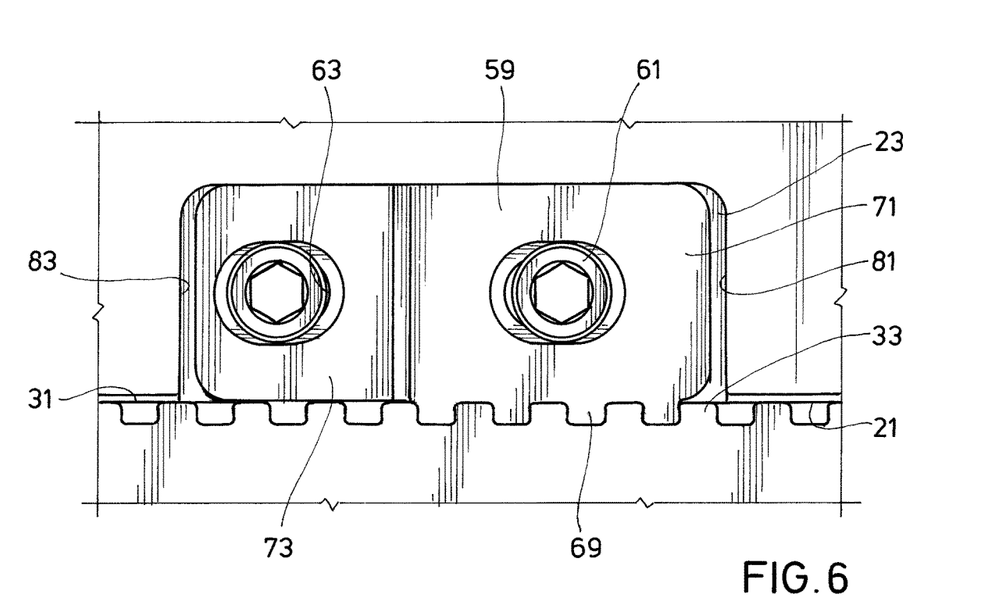
FIG. 6 is a perspective view of an anti-rotation key in accordance with an embodiment of this application.

Box teeth 33 can be located on box lip 31 of box 41. As shown in the example of FIGS. 1 and 6 box teeth 33 can be machined directly in box lip 31 of box 41. Alternately, as shown in the example of FIGS. 3-5 box teeth 33 can be part of a box key 47. Box key 47 can be located within box recess 49. Box recess 49 is formed in an outer diameter surface of box 27 and extends in an axial direction from box lip 31. Box recess 49 can have a circumferential length that is substantially similar to the circumferential length of box key 47 so that the side ends of box key 47 can contact the inner side walls of box recess 49. Box recess 49 can have a depth that is less than a sidewall thickness of box 27 so that box recess 49 has a back wall. The back wall of box recess 49 and the front and back surface of box key 47 can be planar or can be curved surfaces.

In order to help retain box key 47 within box recess 49, box recess 49 can have box recess profile 51 that engages box key mating profile 53. Box key 47 can have box key mating profile 53 on a first side of box key 47 and box teeth 33 on a second, opposite side of box key 47. Box recess profile 51 and box key mating profile 53 can prevent box key 47 from moving circumferentially relative to box recess 49. Box recess profile 51 and box mating profile 53 can have shoulders that extend generally axially so that any rotational forces between box key 47 and box recess 49 can be transferred effectively between such shoulders. In addition, as can be seen in FIG. 4, box key 47 can have box key slot 55 that fits behind box tab 57 (FIG. 4) of box recess profile 51 to help prevent box key 47 from falling outward and out of box recess 49. In certain embodiments, box key 47 can also be secured within box recess 49 with fasteners (not shown) so that box key 47 is retained with box recess 49. In alternate embodiments, box recess profile 51 and box mating profile 53 can have alternate shapes or configurations to mate box key 47 with box 27.

Looking at FIGS. 3-5, after pin 15 is made-up with box 27, pin key 59 is located within pin recess 22. Pin key 59 is selectively fastenable within the pin recess 22. Fastener 61 can be used to retain pin key 59 within pin recess 22. Pin key 59 has opening 63 through a depth of pin key 59 so that fastener 61 can extend through opening 63 and into pin 15 to retain pin key 59 with pin 15. Fastener 61 can be, for example, a threaded member such as a shoulder screw or bolt that can pass through opening 63 and be threaded into pin 15. Opening 63 can have a larger internal dimension than an outer dimension of the shank of fastener 61, but less than the outer dimension of the head of fastener 61 so that pin key 59 can move relative to pin 15, while still being retained with pin 15.

Pin key 59 has a row of pin teeth 69 along an outer edge of pin key 59. Pin key 59 extends from and out of pin recess 22 so that pin teeth 69 extend axially past pin lip 21. When pin key 59 is inserted in pin recess 22, pin key 59 can be aligned so that box teeth 33 mate with pin teeth 69 and resist rotation of pin 15 relative to box 27. In the example embodiments shown, box teeth 33 and pin teeth 69 are shaped as castellations. In alternate embodiments, box teeth 33 and pin teeth 69 can have other mating shapes and configurations.

Pin recess 22 can have a larger width 65 than a width 67 of pin key 59 (FIG. 4) so that pin key 59 can move from side to side within pin recess 22. As an example, pin recess 22 can be sized with a width 65 greater than width 67 of pin key 59 by at least one half of the pitch length of pin teeth 69. This allows pin key 59 to have some play within pin recess 22, to be able to mate pin teeth 69 with box teeth 33, after the threaded connection has been made up between pin 15 and the box 27. However, the internal dimension of opening 63 should not be so large compared to the excess width of pin recess 22 such that fastener 61 is subjected to shearing forces during any relative rotational movement between pin 15 and box 27. Instead the loads will be transferred between box teeth 33, pin teeth 69, and an inside wall of pin recess 22 as is further described herein. Back surface 23 of pin recess 22 can be a planar surface and the front and back faces of pin key 59 can also be planar. In alternate embodiments, back surface 23 of pin recess 22 and the front and back faces of pin key 25 can be curved surfaces and can, as an example, have a similar curvature as the sidewall of pin 15.

Pin recess 22 is located on pin 15 in a position such that each of the pin teeth 69 can engage box teeth 33 when pin 15 is threaded into box 27 until pin lip 21 engages box lip 31. In order to ensure that pin recess 22 will align with box teeth 33 when pin 15 is releasably secured to box 27 in a fully made-up position, the location of pin recess 22 can be pre-determined by clocking the final made-up position of box teeth 33 relative to pin 15 prior to forming pin recess 22 in pin 15. This clocking procedure can be completed by making up pin 15 with a dummy box that has an identical configuration of box threads 29 and relative location of box teeth 33 as actual box 41. Due to this clocking procedure to determine the position of pin recess 22 on pin 15, each of the pin teeth 69 can engage box teeth 33 when pin 15 is threaded to box 41 to a fully made-up position.

In order to accommodate a range of final positions of pin recess 22, the number of pin teeth 69 is less than the number of box teeth 33. In this way, when pin 15 is releasably secured to box 27 and each of the pin teeth 69 engages one of the box teeth 33, there are options as to which box teeth 33 are engaged by pin teeth 69. For example, looking at the embodiment of FIG. 4, the two gaps between box teeth 33 on either side of pin key 59 do not house any pin teeth 69. In alternate examples the number of gaps between box teeth 33 on either side of pin key 59 can be as few as zero or can be greater than two.

Looking at FIGS. 4-5, pin key 59 has additional opposite pin teeth 69 on an inner edge of pin key 59. Pin key 59 is shaped so that pin teeth 69 on either the inner edge or outer edge of pin key 59 can be mated with box teeth 33. In this way, the operator can select an optimal orientation of pin key 59 when inserting pin key 59 within pin recess 22. As an example, in some embodiments, pin key 59 can be symmetrical about an axis Ax (FIG. 5), other than pin teeth 69 on the inner edge and outer edge being offset from each, for example, by one half of a pitch. This offset between pin teeth 69 will allow the operator to insert the pin key into the pin pocket in the orientation that provides a best fit with box teeth 33. In other embodiments, pin key 59 can be symmetrical about the axis Ax, but have a different spacing between the ends of pin key 59 and the first of the pin teeth 69 on each of the inner edge and out edge, in order to provide different pin teeth locations, depending on the orientation of pin key 59 within pin recess 22. In yet other alternate embodiments, pin key 59 can be asymmetrical about the axis Ax, to provide the desired offset of pin teeth 69 on the opposite sides of pin key 59.

Figure 7:
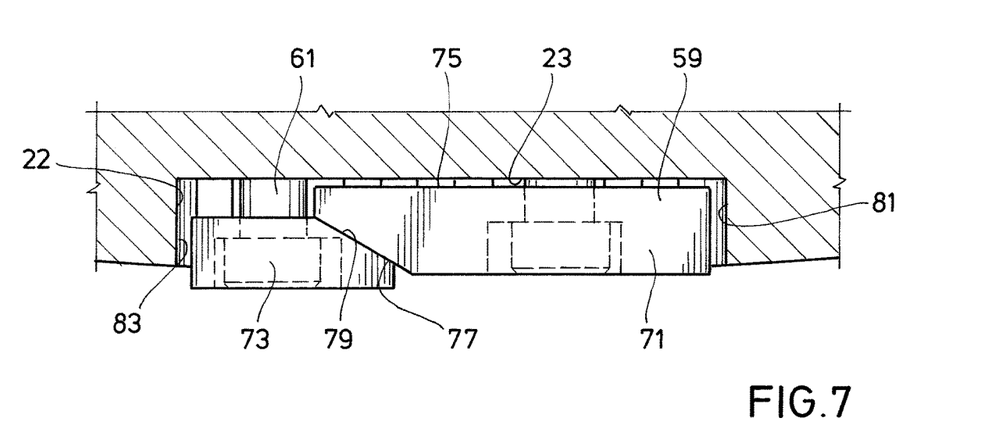
FIG. 7 is a top section view of the anti-rotation key of FIG. 6, shown before the wedge fastener is tightened.
Figure 8:
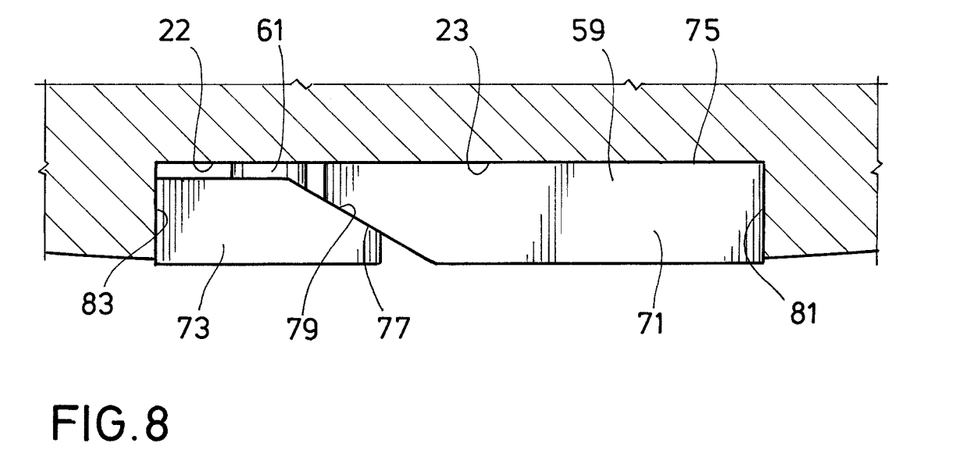
FIG. 8 is a top section view of the anti-rotation key of FIG. 6, shown after the wedge fastener is tightened.
Figure 9:
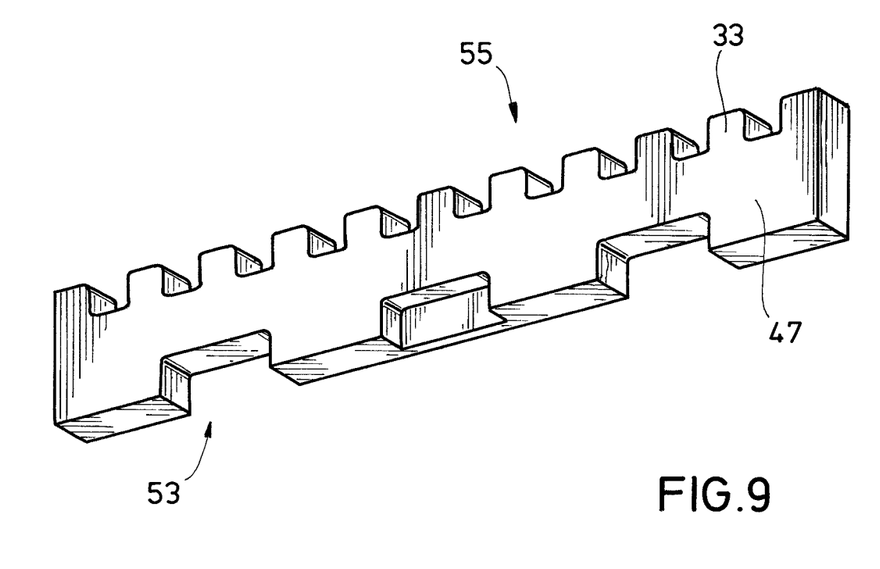
FIG. 9 is a perspective view of the box key in accordance with an embodiment of this application.

Looking at FIGS. 6-8, pin key 59 is a two part member and includes base key member 71 and wedge key member 73. Wedge key member 73 is free of pin teeth 69 so that wedge key member 73 can move from side to side relative to box teeth 33. Base key member 71 has a back face 75 that can engage back surface 23 of pin recess 22. Base key member 71 also has wedge shaped front portion 77. Wedge key member 73 has wedge shaped back portion 79 that can engage wedge shaped front portion 77 and move base key member 71 towards back surface 23 of pin recess 22. When a side of wedge key member 73 engages an opposite side 83 of pin recess 22 (FIG. 8), fastener 61 can be at a tightness that will maintain the position of wedge key member 73 relative to base key member 71. This engagement will eliminate the play between pin 15 and box 27 so that pin key 59 will prevent any relative rotational movement between pin 15 and box 27.

Note that although pin recess 22 has been described herein as being formed on pin 15 and box teeth 33 are described herein as being formed in box 27, in alternate embodiments, a recess for receiving an anti-rotation key can be formed in box 27 and mating teeth can be formed in pin 15.

In an example of operation, box 27 can be provided on lower tubular member 25, and box teeth 33 can be formed in box lip 31. As an example box teeth 33 can be formed in box lip 31 by machining box teeth 33 in box lip 31. Alternately, in order to simplify the fabrication of box 27, box recess 49 can be machined in box 27 and box key 47 can be located in box recess 49. Pin 15 can be provided on upper tubular member 13. Pin recess 22 can be formed in an outer diameter surface of pin 15, such as by machining pin recess 22 in pin 15. The location of pin recess 22 can be clocked so that pin recess 22 will align with box teeth 33 when pin 15 and box 27 are fully made-up.

Nose 19 of pin 15 can then be located within box 27 and pin 15 can be rotated so that box threads 29 can mate with pin threads 17. Pin 15 can be threaded to box 27 in a make-up rotation direction until pin lip 21 engages box lip 31. Once pin 15 is fully made-up with box 27, pin key 59 can be inserted into, and fastened within, pin recess 22. When inserting pin key 59 within pin recess 22, the operator can, in some embodiments, select the orientation of pin key 59 to optimize the location of pin key 59 relative to box teeth 33.

In certain other embodiments, base key member 71 is first fastened within pin recess 22 with fastener 61 in a manner that allows base key member 71 to move relative to pin recess 22. Wedge key member 73 can engage base key member 71 by tightening fastener 61 that passes through wedge key member 73. The interaction of wedge shaped back portion 79 of wedge key member 73 with wedge shaped front portion 77 base key member 71 can push back face 75 of base key member 71 towards back surface 23 of pin recess 22. A side of wedge key member 73 will engage opposite side 83 of pin recess 22. This could cause the threaded connection between pin 15 and box 27 to further tighten. In certain embodiments, the side of base key member 71 will engage the first side of pin recess 22. In alternate embodiments, pin 15 can be rotated no farther in box 27 and the side of base key member 71 is not engaging the first side of pin recess 22. The interaction of box teeth 33 with pin teeth 69, together with the engagement of the side of wedge key member 73 with opposite side 83 of pin recess 22 will prevent any relative rotation between pin 15 and box 27.

Normally, tubular member connection system 11 is not unscrewed once made up. On some occasions, however, the operator might wish to unscrew tubular member connection system 11. In such a case, an operator can manually remove pin key 59 and pin 15 can be rotated relative to box 27 in an unscrewing direction to release pin 15 from box 27 so that upper tubular member 13 can be separated from lower tubular member 25.

Systems and methods disclosed here are therefore well adapted to carry out the objects and attain the ends and advantages mentioned, as well as others inherent therein. While an example embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of this disclosure and the scope of the appended claims. The terms "vertical", "horizontal", "upward", "downward", "top", and "bottom" are used herein only for convenience because the tubular members may be installed in various positions.

What is claimed is:

1. A tubular member connection system, comprising:
   a pin having a central axis, external pin leading threads, and an annular pin lip at a shoulder surface of the pin;
   a box having internal box leading threads and an annular box lip at an end surface of the box, the box threads shaped to mate with the pin threads to releasably secure the pin to the box;
   a pin recess formed in an outer diameter surface of the pin, the pin recess extending in an axial direction from the pin lip;
   a pin key selectively fastenable within the pin recess, the pin key having pin teeth on an outer edge of the pin key, and extending circumferentially less than 360 degrees around the pin; and
   box teeth located in the box, the box teeth selectively mating with the pin teeth and resisting rotation of the pin relative to the box.

2. The system according to claim 1, further comprising:
   a box recess formed in an outer diameter surface of the box, the box recess extending in an axial direction from the box lip; and
   a box key selectively retainable within the box recess, the box key having the box teeth for mating with the pin teeth.

3. The system according to claim 1, further comprising a box key selectively retainable within a box recess, the box key having a box key mating profile on a first side for mating with a box recess profile of the box recess, the box key further having the box teeth on a second side.

4. The system according to claim 1, wherein the box teeth and the pin teeth are shaped as castellations.

5. The system according to claim 1, wherein the pin key has opposite pin teeth on an inner edge of the pin key, the pin key being shaped so that one of the pin teeth and the opposite pin teeth selectively mate with the box teeth.

6. The system according to claim 1, wherein the pin key includes a base key member and a wedge key member, the base key member having a back face engaging a back surface of the pin recess and the wedge key member having a wedge shaped back portion engaging a wedge shaped front portion of the base key member and a side of the wedge key member engaging a side of the pin recess.

7. The system according to claim 1, further comprising a fastener selectively fastening the pin key in the pin recess, wherein the pin key has an opening through a depth of the pin key and the fastener extends through the opening and into the pin, the opening having a larger internal dimension than an outer dimension of the fastener so that the pin key can move relative to the pin.

8. The system according to claim 1, wherein the number of pin teeth is less than the number of box teeth.

9. The system according to claim 1, wherein the pin recess is located on the pin in a position such that each of the pin teeth engages the box teeth when the pin is threaded to the box until the pin lip engages the box lip.

10. The system according to claim 1, wherein the pin key extends from the pin recess so that the pin teeth are axially past the pin lip.

11. A tubular member connection system, comprising:
    a pin having a central axis, external pin threads, and an annular pin lip at a shoulder surface of the pin;
    a first tubular member extending from the pin in a direction opposite the pin lip of the pin;
    a box having internal box threads and an annular box lip at an end surface of the box, the box threads shaped to mate with the pin threads to releasably secure the pin to the box;
    a second tubular member extending from the box in a direction opposite the end surface of the box;
    a pin recess formed in an outer diameter surface of the pin, the pin recess extending in an axial direction from the pin lip;
    a box recess formed in an outer diameter surface of the box, the box recess extending in an axial direction from the box lip and having a box recess profile;
    a pin key selectively fastenable within the pin recess, the pin key having pin teeth on an outer edge of the pin key, and extending circumferentially less than 360 degrees around the pin; and
    a box key selectively retainable with the box recess, the box key having a box key mating profile on a first side for mating with the box recess profile, the box key further having box teeth on a second side for mating with the pin teeth and resisting rotation of the pin relative to the box.

12. The system according to claim 11, wherein the pin key has opposite pin teeth on an inner edge of the pin key, the pin key being shaped so that one of the pin teeth and the opposite pin teeth selectively mate with the box teeth.

13. The system according to claim 11, wherein the pin key includes a base key member and a wedge key member, the base key member having a back face engaging a back surface of the pin recess and the wedge key member having a wedge shaped back portion engaging a wedge shaped front portion of the base key member and a side of the wedge key member engaging a side of the pin recess.

14. The system according to claim 11, wherein the pin recess is located on the pin in a position such that each of the pin teeth engages the box teeth when the pin is threaded to the box until the pin lip engages the box lip.

15. The system of claim 11, wherein the first tubular member has a second box at an opposite end of the first tubular member from the pin, the second box being releasable secured to a second pin to form a tubular string.

16. A method for connecting tubular members, the method comprising:

providing a pin having a central axis, external pin threads, and an annular pin lip at a shoulder surface of the pin, the pin further having a pin recess formed in an outer diameter surface of the pin, the pin recess extending in an axial direction from the pin lip;

providing a box having internal box threads and an annular box lip at an end surface of the box, the box threads shaped to mate with the pin threads to releasably secure the pin to the box;

locating box teeth in the box;

mating the box threads with the pin threads to releasably secure the pin to the box; and fastening a pin key within the pin recess, the pin key having pin teeth on an outer edge of the pin key and mating the pin teeth with the box teeth to resist rotation of the pin relative to the box, the pin key extending circumferentially less than 360 degrees around the pin.

17. The method according to claim 16, wherein the step of locating box teeth in the box further comprises:

forming a box recess in an outer diameter surface of the box, the box recess extending in an axial direction from the box lip; and retaining a box key within the box recess, the box key having the box teeth for mating with the pin teeth.

18. The method according to claim 16, wherein the pin key has the pin teeth on an inner edge of the pin key, and wherein the step of mating with the pin teeth with the box teeth includes mating one of the pin teeth on the outer edge and the pin teeth on the inner edge with the box teeth.

19. The method according to claim 16, wherein the pin key includes a base key member and a wedge key member, and wherein the method further comprises tightening a fastener that extends through the wedge key member so that a wedge shaped back portion of the wedge key member engages a wedge shaped front portion of the base key member and a side of the wedge key member engaging an opposite side of the pin recess.

20. The method according to claim 16, wherein the pin recess is located on the pin in a position such that each of the pin teeth engages the box teeth when the pin is threaded to the box until the pin lip engages the box lip.

* * * * *